United States Patent
Shelton et al.

(10) Patent No.: US 10,987,803 B2
(45) Date of Patent: Apr. 27, 2021

(54) AUTOMATED ROBOTIC BATTERY TUG

(71) Applicant: THE AES CORPORATION, Arlington, VA (US)

(72) Inventors: John C. Shelton, Vienna, VA (US); Brett Galura, Falls Church, VA (US); Jay Geinzer, Glenwood, MD (US); Isaiah Jefferson, Mitchellville, MD (US); Brian Peruse, Lima (PE)

(73) Assignee: The AES Corporation, Arlington, VA (US)

( * ) Notice: Subject to any disclaimer, the term of this patent is extended or adjusted under 35 U.S.C. 154(b) by 192 days.

(21) Appl. No.: 16/399,549

(22) Filed: Apr. 30, 2019

(65) Prior Publication Data
US 2019/0255702 A1    Aug. 22, 2019

Related U.S. Application Data

(62) Division of application No. 14/721,522, filed on May 26, 2015, now Pat. No. 10,272,567.

(51) Int. Cl.
*G06F 7/00* (2006.01)
*B25J 9/16* (2006.01)
*H02J 7/00* (2006.01)

(52) U.S. Cl.
CPC ............. *B25J 9/162* (2013.01); *B25J 9/1697* (2013.01); *H02J 7/0027* (2013.01);
(Continued)

(58) Field of Classification Search
CPC . B25J 9/162; B25J 9/1697; B25J 5/007; B25J 9/1661; B25J 9/1679; B25J 11/008;
(Continued)

(56) References Cited

U.S. PATENT DOCUMENTS 8,736,228 B1    5/2014  Freed et al.
8,922,163 B2   12/2014  Macdonald
(Continued)

FOREIGN PATENT DOCUMENTS

RU    23201487 C2    4/2008

OTHER PUBLICATIONS

Office Action dated Sep. 2, 2019, by the Federal Service for Intellectual Property in Russian Patent Application No. 2016120583/07(032340), and an English Translation of the Office Action. (14 pages).
(Continued)

*Primary Examiner* — Yolanda R Cumbess
(74) *Attorney, Agent, or Firm* — Morgan, Lewis & Bockius LLP

(57) ABSTRACT

A method of selecting and connecting power subsystems, the method including: locating, by a mobile robot including a processor and a motor, at least one of a first storage subsystem, a first power subsystem, or a first control subsystem; attaching, by the mobile robot, to the at least one of the first storage subsystem, the first power subsystem, or the first control subsystem; moving, by the mobile robot, the at least one of the first storage subsystem, the first power subsystem, or the first control subsystem to another location; and connecting, by the mobile robot, the at least one of the first storage subsystem, the first power subsystem, or the first control subsystem to at least one of a second storage subsystem, a second power subsystem, or a second control subsystem located at the other location.

10 Claims, 10 Drawing Sheets

(52) U.S. Cl.
CPC .......... *H02J 7/0044* (2013.01); *H02J 7/0045* (2013.01); *H02J 7/00034* (2020.01); *Y02T 10/70* (2013.01); *Y10S 901/01* (2013.01)

(58) Field of Classification Search
CPC ...... B25J 19/005; H02J 7/0045; H02J 7/0044; H02J 7/0027; H02J 7/00034; H02J 3/32; H02J 13/0006; H02J 7/342; Y02T 10/70; Y10S 901/01; Y02B 70/30; Y04S 20/221; G06Q 10/06; G06Q 50/30; B65G 1/04; B65G 1/137
USPC .................................. 700/213, 218, 228–229
See application file for complete search history.

(56) References Cited

U.S. PATENT DOCUMENTS

| | | |
|---|---|---|
| 9,698,393 B2 | 7/2017 | Fukui et al. |
| 2008/0174268 A1 | 7/2008 | Koo et al. |
| 2009/0169347 A1 | 7/2009 | Teng et al. |
| 2011/0106294 A1* | 5/2011 | Bebbington .......... B66F 9/0754 700/215 |
| 2012/0045303 A1 | 2/2012 | Macdonald |
| 2013/0030581 A1* | 1/2013 | Luke .................. G06Q 30/0253 700/286 |
| 2015/0151723 A1* | 6/2015 | Yang ...................... B60L 53/80 414/331.09 |
| 2015/0183326 A1* | 7/2015 | Ryberg .................. B60L 53/00 320/109 |
| 2016/0266578 A1 | 9/2016 | Douglas et al. |

OTHER PUBLICATIONS

Office Action (First Office Action) dated Mar. 22, 2019 by the State Intellectual Property Office of the People's Republic of China in corresponding Chinese Patent Application No. 201610363480.7, and an English Translation of the Office Action. (7 pages).

Nov. 3, 2016 extended European Search Report issued by the European Patent Office in European Application No. 16171154.4 (10 pages).

Office Action (Substantive Examination Report) dated Mar. 20, 2018, by the Chilean Patent Office in corresponding Chilean Patent Application No. 2016-01237 and an English Translation of the Office Action (12 pages).

Office Action (Second Office Action) dated May 23, 2016, by the Chilean Patent Office in corresponding Chilean Patent Application No. 2016-01237 (5 pages).

* cited by examiner

AUTOMATED ROBOTIC BATTERY TUG

CROSS-REFERENCE TO RELATED APPLICATIONS

This application is a divisional of U.S. patent application Ser. No. 14/721,522 filed May 26, 2015, which content is hereby incorporated by reference in its entirety. The instant application is also related to application Ser. No. 14/721,582 entitled "Modular Energy Storage Method and System," and application Ser. No. 14/721,533 entitled "Method and System for Self-Registration and Self-Assembly of Electrical Devices," the content of which are both incorporated by reference in their entirety.

BACKGROUND

The present disclosure is directed to a method and system for moving and/or connecting of electrical devices. The electrical devices can be energy storage devices that are located in an energy storage facility.

SUMMARY

A method of selecting and connecting power subsystems, the method including: locating, by a mobile robot including a processor and a motor, at least one of a first storage subsystem, a first power subsystem, or a first control subsystem; attaching, by the mobile robot, to the at least one of the first storage subsystem, the first power subsystem, or the first control subsystem; moving, by the mobile robot, the at least one of the first storage subsystem, the first power subsystem, or the first control subsystem to another location; and connecting, by the mobile robot, the at least one of the first storage subsystem, the first power subsystem, or the first control subsystem to at least one of a second storage subsystem, a second power subsystem, or a second control subsystem located at the other location.

A power system, including: a storage subsystem that includes one or more batteries, and a processor that is configured to control charging and discharging of at least one battery among the one or more batteries; and a mobile robot that includes a second processor, a motor, and a battery, and the mobile robot is configured to connect, remove, replace, or configure at least one of the one or more batteries in the storage subsystem.

A power storage rack distribution system, including: a plurality of moveable power storage racks, each moveable power storage rack includes: a storage subsystem including one or more batteries which are removable and chargeable, and a processor that is configured to control charging and discharging of at least one battery among the one or more batteries; and a mobile robot that includes a second processor, a motor, and a battery, wherein the mobile robot is configured to: locate a first movable power storage rack having specific power storage characteristics from among the plurality of moveable power storage racks, attach to the first moveable power storage rack that is located at a first location, and move the first moveable power storage rack from the first location to a second location.

A power storage rack distribution system, including: a plurality of moveable power storage racks, each moveable power storage rack includes one or more batteries which are removable and chargeable; a mobile robot that includes a processor, a motor, and a battery, wherein the mobile robot is configured to: locate a first movable power storage rack having specific power storage characteristics from among the plurality of moveable power storage racks, attach to the first moveable power storage rack that is located at a first location, and move the first moveable power storage rack from the first location to a second location.

These and other features and advantages of particular embodiments of the rack based unit energy storage method and system will now be described by way of exemplary embodiments to which they are not limited.

BRIEF DESCRIPTION OF THE DRAWINGS

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

This description provides exemplary embodiments only, and is not intended to limit the scope, applicability or configuration of the method and system for moving and/or connecting electrical devices using a mobile robot. Rather, the ensuing description of the embodiments will provide those skilled in the art with an enabling description for implementing embodiments of the method and system for moving and/or connecting electrical devices using a mobile robot. Various changes may be made in the function and arrangement of elements without departing from the spirit and scope of the system and method as set forth in the appended claims. Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

The present disclosure is directed to a method and system for moving and/or connecting of electrical devices. The electrical devices can be any type of electrical device, for example, energy storage devices. An automated robot can move, replace, configure, and/or connect one or more of the electrical devices (e.g., one or more batteries.

For example, the automated robot can move and/or connect the one or more electrical devices to form a functioning electrical system. For example, the automated robot can move and/or connect one or more of the energy storage devices in order to create a dynamically scalable energy storage system that can be used in an energy storage facility. The energy that is stored in the energy storage devices that are assembled into the storage system can be used in a variety of different scenarios, including applications such as peak-shaving, emergency power, and system stability control with duty cycles ranging from seconds to several hours.

Figure 8:
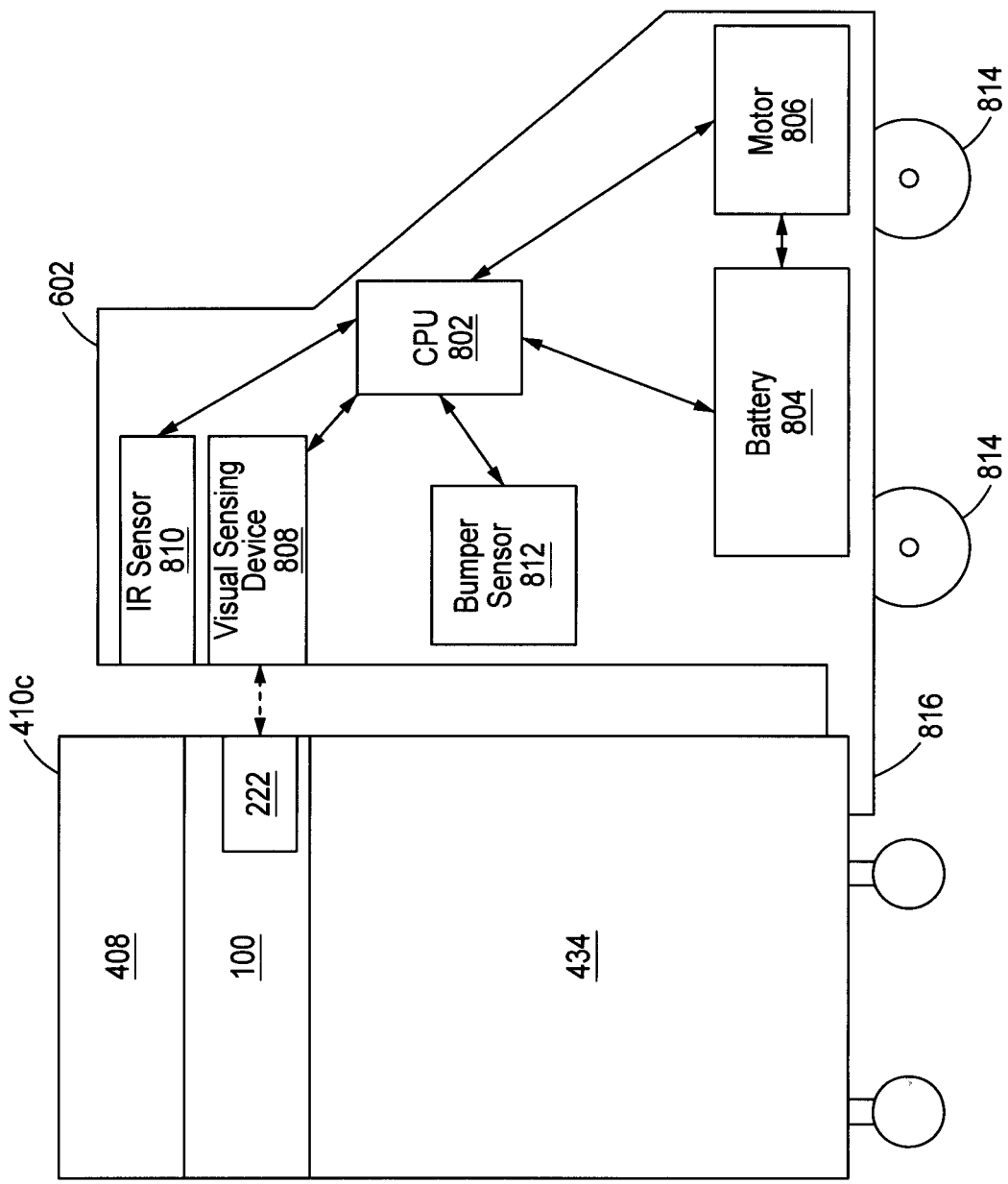
FIG. 8 illustrates a side view of a mobile robot and a power storage container in accordance with an exemplary embodiment.

FIG. 8 illustrates an exemplary automated mobile robot 602 that can be used to move one or more electrical devices from one location to another location and/or connect two or more electrical devices to each other so that they can communicate/work with each other. As described above, the electrical devices can be any kind/kinds of devices. For example, the electrical devices can be devices for storing energy, transferring energy, converting energy, etc. The mobile robot 602 can be an automated robotic tug or any other robot that is capable of moving electrical components or devices from one location to another.

The mobile robot 602 can move individual electrical components or can move containers containing one or more electrical components. The mobile robot 602 can also rearrange/move/connect electrical components that are located at a particular location or within and/or fixed to a particular container. For example, the container can be a moveable storage rack or other vessel to which the electrical components can be mounted, and the mobile robot 602 can rearrange the electrical components within the rack, add or remove an electrical component from the rack, or exchange an electrical component in the rack with an electrical component from another location.

In an exemplary embodiment, the mobile robot 602 can connect one or more electrical components in the rack together. For example, by attaching wires (e.g., power cords, signal cables, etc.) in between the components. The moveable storage rack can contain wheels, casters or any other device that allows the rack to be pushed or pulled across a floor by the mobile robot 602.

FIG. 8 shows an exemplary power system that includes a container 410c, for example a storage rack, that contains electrical components 100, 408, and 434. The storage rack 410c can contain any number of components. In a non-limiting embodiment, the container 410 is configured to hold at least one of: a storage subsystem 434, a power subsystem 408, and a control subsystem 100. As shown in detail in FIGS. 4 and 5, the storage subsystem 434 can include one or more batteries 406, and a processor 432 (e.g., CPU) that is configured to control charging and discharging of at least one battery 406 among the one or more batteries 406. The hardware architecture of the storage subsystem 434 will be explained in greater detail later.

The power subsystem 408 is configured to be connected to a power line, and the power subsystem 408 includes a power converter 416 which is configured to convert AC power to DC power when the at least one battery 406 is being charged, and is configured to convert DC power to AC power when the at least one battery 406 is being discharged. The hardware architecture of the power subsystem 408 will be explained in greater detail later. Ser. No. 14/721,582 entitled "Modular Energy Storage Method and System" further describes rack based power systems and is incorporated herein by reference in its entirety.

The control subsystem 100 is configured to be connected to the storage subsystem 434 and is configured to be connected to the power subsystem 408 and/or the storage subsystem 434. In an exemplary embodiment, the mobile robot 602 can connect the storage subsystem 434 to the power subsystem 408 and/or the storage subsystem 434. The control subsystem 100 includes a processor 102 (e.g., CPU), and the processor 102 is configured to control transferring of power between the storage subsystem 434 and the power subsystem 408.

Hardware Architecture of the Mobile Robot

The exemplary system of FIG. 8 shows a detailed view of the hardware of the mobile robot 602 that includes, for example, a processor 802 (e.g., a CPU), a motor 806, and a battery 804. The processor 802 controls the functions/movements of the mobile robot 602. The motor 806 provides the motive force for the robot 602 and drives the wheels 814, caterpillar track, etc. of the mobile robot 602. The motor 602 can be an electric motor that is connected to a battery 804 that can be rechargeable or the motor can be a combustion motor that runs on a fuel such as gasoline, diesel, ethanol, etc. The mobile robot 602 can also be a hybrid vehicle and use an electric motor and a combustion motor.

Figure 3:
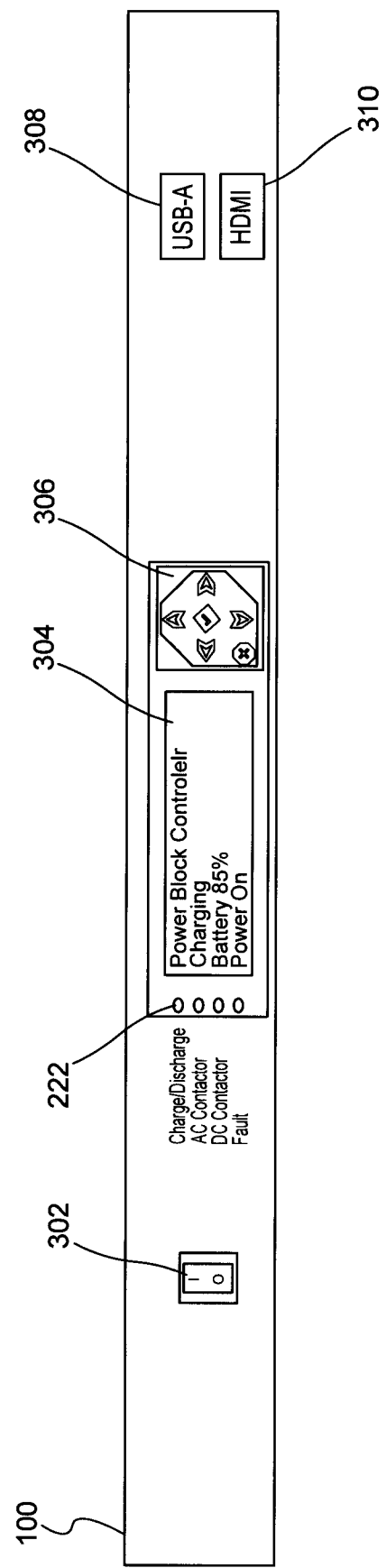
FIG. 3 illustrates a front panel of the control subsystem in accordance with an exemplary embodiment.

In an exemplary embodiment, the mobile robot 602 can include a bumper sensor 812. The bumper sensor 812 is used to detect obstacles that are close to the mobile robot 602 or in the path of the mobile robot 602. The mobile robot 602 can also include a visual sensing device 808 that can detect and read information that is outputted on the front panel of an electrical device that is located in the container 410c. For example, the visual sensing device 808 can read information from the control subsystem 100, for example, the LEDs 222 as shown in FIG. 3. The front panel of the control subsystem 100 will be explained in greater detail later. The mobile robot 602 can also include an IR sensor 810. The IR sensor 810 detects obstacles and measures distances to various objects and helps the robot navigate from location to location. In an exemplary embodiment, the mobile robot 602 includes a coupler 816 which is a device that allows the mobile robot 602 to attach to the moveable container and push or pull the moveable container to a different location. Also, the mobile robot can include a receiver, such as an antenna, for receiving wireless commands or other data. The commands and data can be used by the mobile robot 602 to automatically move and/or connect the electrical components within the container to other components within the container or to other components in other containers to form a system with specific desired characteristics. The commands and the data can also be used for the mobile robot 602 to locate components or containers with certain desirable characteristics.

Exemplary Methods for Moving/Transporting Components

Figure 9:
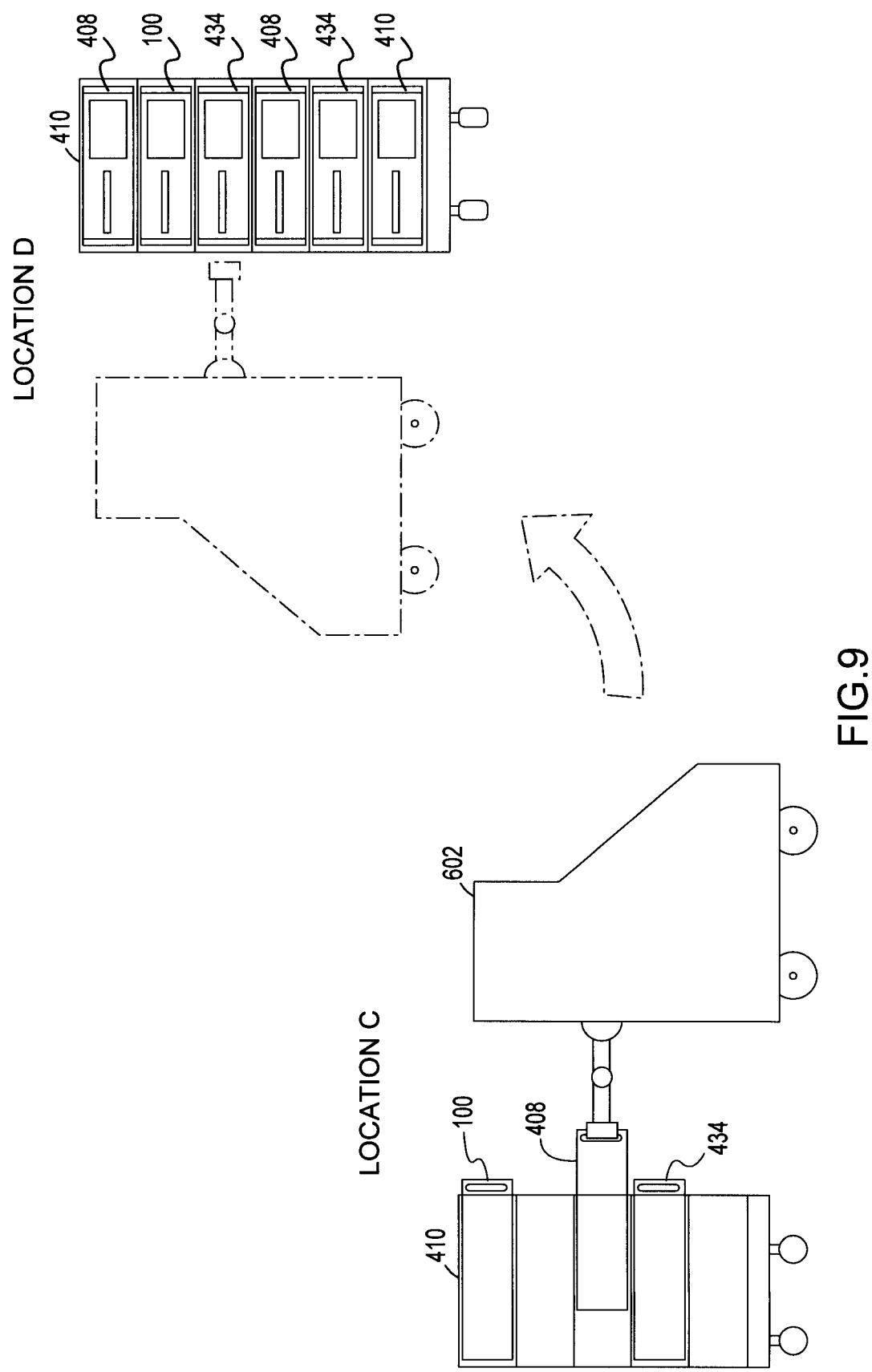
FIG. 9 illustrates a mobile robot and power storage container in accordance with an exemplary embodiment.

In an exemplary embodiment shown in FIG. 9, the mobile robot 602 is configured to locate at least one of the storage subsystem 434, the power subsystem 408, or the control subsystem 100 from a different location than the container 410. The mobile robot 602 can attach to at least one of the storage subsystem 434, the power subsystem 408, or the control subsystem 408 at the different location, and then place the at least one of the storage subsystem 434, the power subsystem 408, or the control subsystem 100 into the container 410.

In an exemplary embodiment, the container 410 includes at least one of the storage subsystem 434, the power subsystem 408, or the control subsystem 100, and the mobile robot 602 is configured to locate the at least one of the storage subsystem 434, the power subsystem 408, or the control subsystem 100 that is held in the container 410. Next, the mobile robot 602 travels to the located item (the at least one of the storage subsystem 434, the power subsystem 408, or the control subsystem 100), for example located at location C in FIG. 9, and attaches to the at least one of the storage subsystem 434, the power subsystem 408, or the control subsystem 100 in the container 410. The mobile robot can have for example, robotic arms, pinchers, hooks, etc. as a means for attaching to the storage subsystem 434, the power subsystem 408, or the control subsystem 100 in the container 410. Next, as shown in FIG. 9, the mobile robot 602 can remove the storage subsystem 434, the power subsystem 408, or the control subsystem 100 from the container. For example, by pulling the component out through an opening in the front of the container 410.

In an exemplary embodiment, the mobile robot 602 is further configured to move the removed storage subsystem 434, the power subsystem 408, or the control subsystem 100 to a location different from the container in which it received the component. For example, in FIG. 9, the mobile robot 602 has removed the power subsystem 408 from the storage rack located at location C, moves to location D with the removed power subsystem 408, and places the removed power subsystem into the storage rack located at location D. In an exemplary embodiment, the mobile robot 602 can move to an intermediate location or perform other functions (e.g., charging of the mobile robot's batteries) before proceeding to location D. In an exemplary embodiment, the mobile robot 602 can move more than one component, device, container, etc. at the same time.

Figure 10:
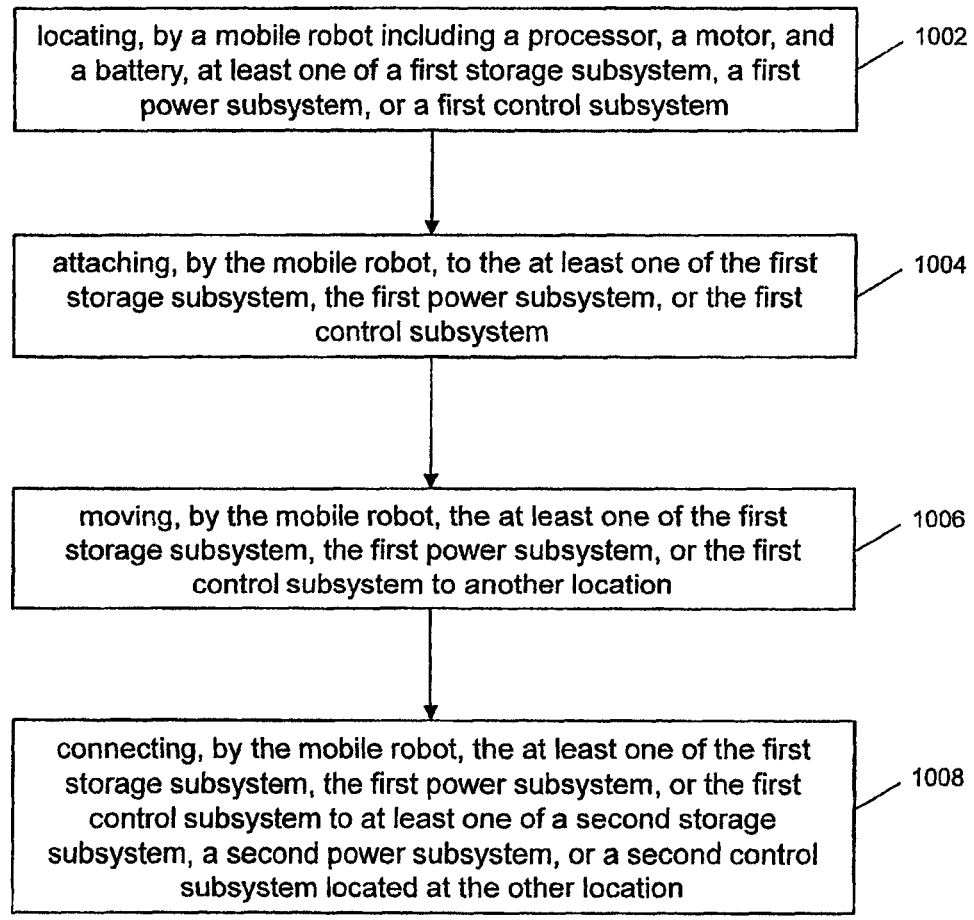
FIG. 10 illustrates a method performed in accordance with an exemplary embodiment.

FIG. 10 illustrates an exemplary sequence of the exemplary method described above. In step 1002, the mobile robot 602 locates at least one of a first storage subsystem 434, a first power subsystem 408, and a first control subsystem. For example, as described above, the robot 602 locates the power subsystem 408 that is at location C, as shown in FIG. 9. In step 1004, the mobile robot 602 attaches to the at least one of the first storage subsystem 434, the first power subsystem 408, or the first control subsystem 100. For example, as described above, the robot 602 attaches to the power subsystem 408 that is at location C. In step 1006, the mobile robot 602 moves the at least one of the first storage subsystem 434, the first power subsystem 408, or the first control subsystem 100 to another location (for example, location D shown in FIG. 9). In step 1008, the mobile robot 602 connects the at least one of the first storage subsystem 434, the first power subsystem 408, or the first control subsystem 100 to at least one of a second storage subsystem 434, a second power subsystem 408, or a second control subsystem 100 located at the other location (in this example, location D). In an exemplary embodiment, the mobile robot 602 can connect the at least one of the first storage subsystem 434, the first power subsystem 408, or the first control subsystem 100 to at least one of a second storage subsystem 434, a second power subsystem 408, or a second control subsystem 100 by connecting wires between the two components.

In an exemplary embodiment, the mobile robot 602 selects the first storage subsystem 434 to be connected to the second storage subsystem 434 located at the other location in order to achieve a collective battery characteristic for the one or more batteries of the first storage subsystem 434 and the one or more batteries of the second storage subsystem 434.

In an exemplary embodiment, the first power subsystem 408 is configured to be connected to a power line (shown in FIG. 5), and the first power subsystem 408 includes a power converter 416 which is configured to convert AC power to DC power when the at least one battery 406 of the first storage subsystem 434 is being charged, and is configured to convert DC power to AC power when the at least one battery 406 of the first storage subsystem 434 is being discharged.

In an exemplary embodiment, the first control subsystem 100 is configured to be connected to the first storage subsystem 434 and is configured to be connected to the first power subsystem 408, the first control subsystem 100 includes a processor 102 (e.g., a CPU), and the processor 102 is configured to control transferring of power between the first storage subsystem 434 and the first power subsystem 408.

Figure 6:
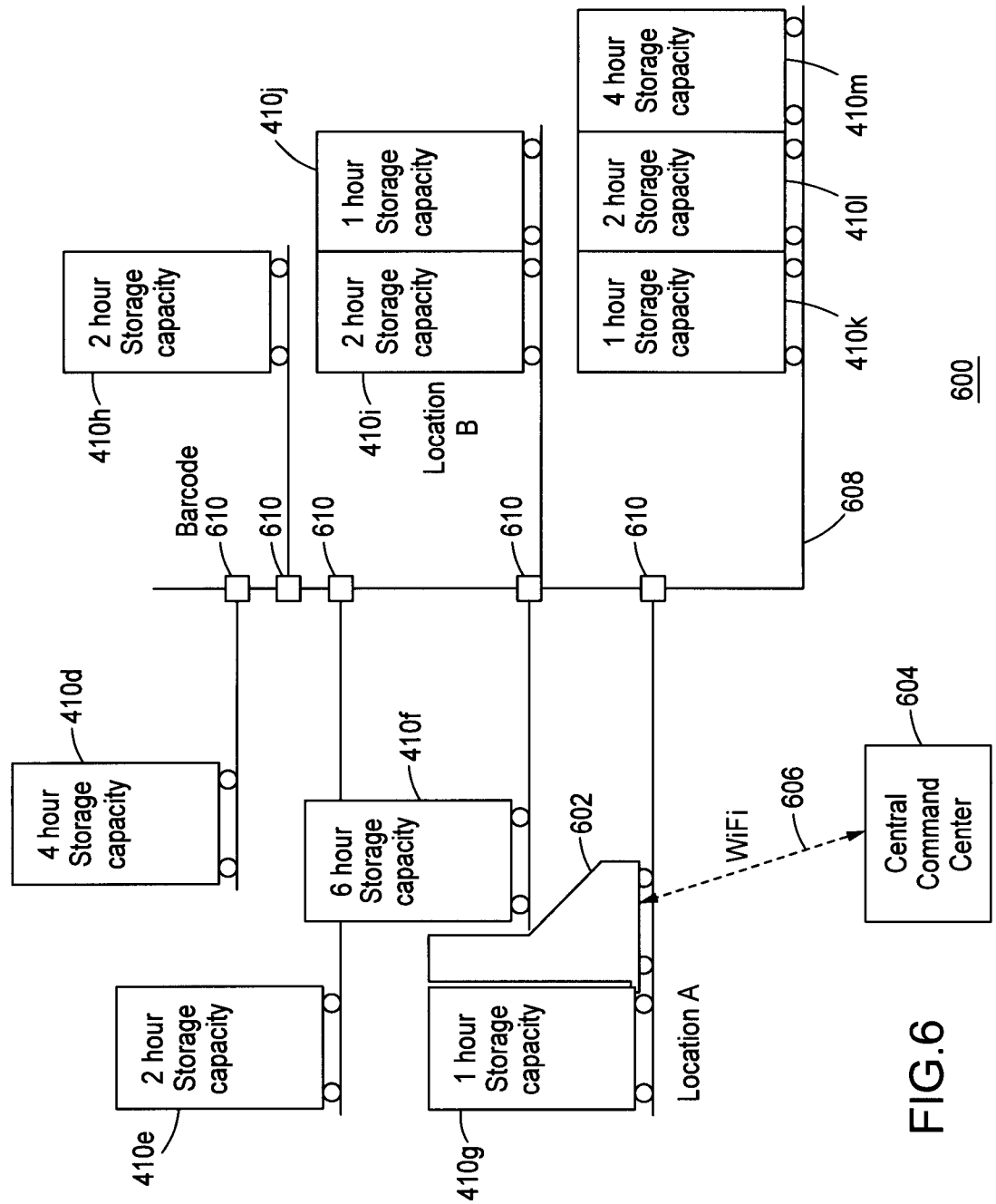
FIG. 6 illustrates a mobile robot and power storage containers in accordance with an exemplary embodiment.
Figure 7:
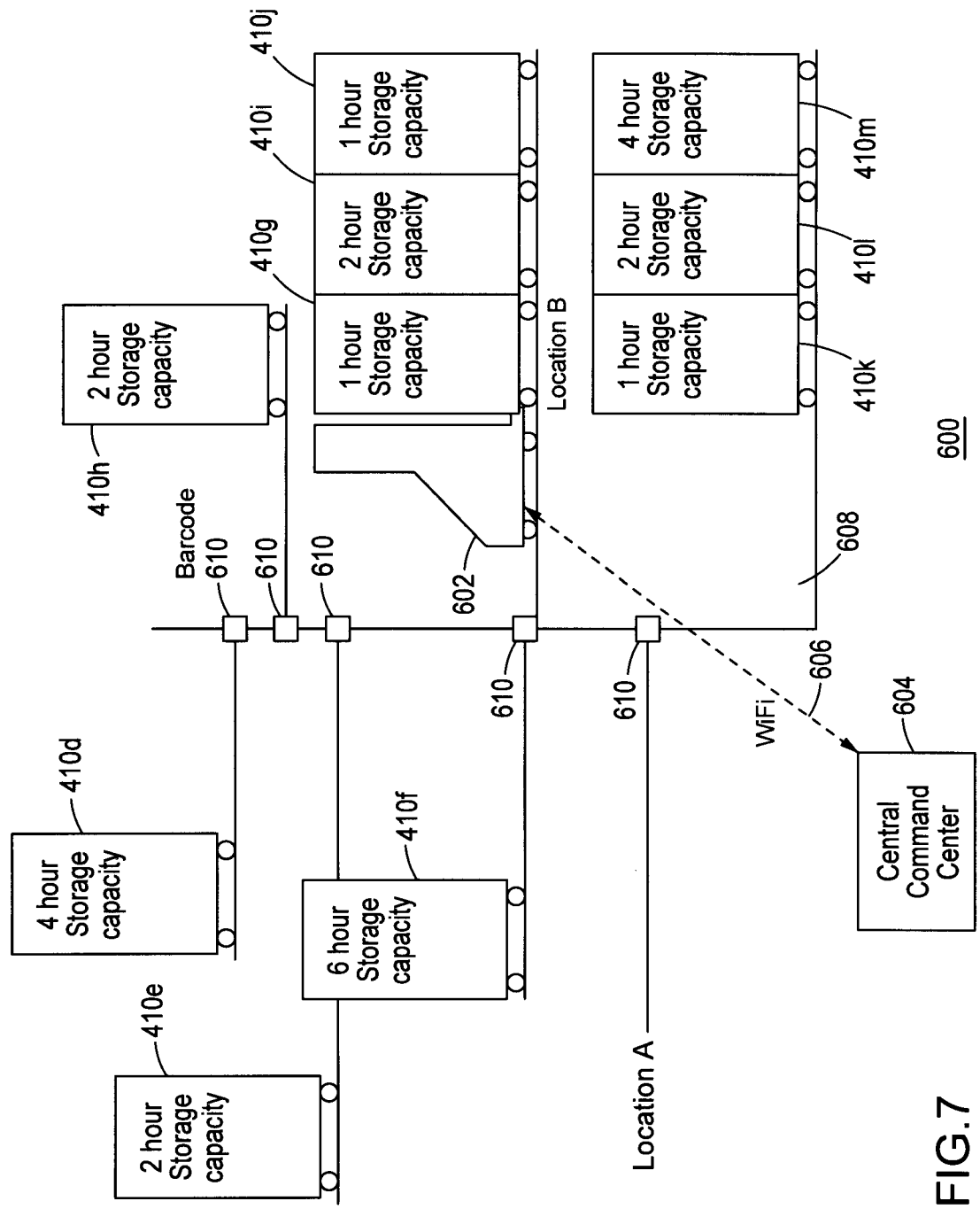
FIG. 7 illustrates a mobile robot and power storage containers in accordance with an exemplary embodiment.

Exemplary Methods for Moving Storage Containers and Creating Scalable Power Systems As discussed above, in an exemplary embodiment, the mobile robot 602 may move an entire container or multiple containers to different locations in order to create a scalable power system. This feature is illustrated in FIGS. 6 and 7 and will be discussed next. The mobile robot 602 can also create a scalable power system within a rack by connecting components with a rack to each other or moving components within the rack, or adding or subtracting components within the rack.

In FIGS. 6 and 7, the exemplary containers are moveable storage racks. FIGS. 6 and 7 illustrate a power storage rack distribution system 600 that stores electrical energy. The power storage rack distribution system 600 could be located in a storage facility, such as a power plant. In an exemplary embodiment, the power storage rack distribution system 600 includes a plurality of moveable power storage racks 410d-410m. The power storage rack distribution system 600 can include any number of power storage racks 410, and thus the system has the advantageous feature of being scalable and components/racks can be easily replaced based on performance requirements, defects, faults, etc. In an exemplary embodiment, each moveable power storage rack 410 shown in FIG. 6 includes a storage subsystem 434 including one or more batteries 406 (shown in FIG. 4) which can be removable and chargeable. The storage subsystem 434 (shown in FIG. 4) also includes a processor 432 that is configured to control charging and discharging of at least one battery 406 among the one or more batteries 406 that are contained in the storage subsystem 434. Alternatively, the one or more batteries 406 could be external to the storage subsystem 434.

The power storage rack distribution system 600 shown in FIGS. 6 and 7 also includes the mobile robot 602 that includes the processor 802, the motor 806, and the battery 804 (shown in FIG. 8). In an exemplary embodiment, the mobile robot 602 is configured to locate a first movable power storage rack (for example, rack 410g) having specific power storage characteristics from among the plurality of moveable power storage racks 410d-410m. The mobile robot 602 can have knowledge about other available power storage racks by receiving information from a central command center 604 or other source (e.g., memory within the mobile robot) that stores information (e.g. specific power storage characteristics) about each of the power storage racks and components present in a particular facility or available at other facilities. The mobile robot 602 can receive the information from the central command center 604 continuously or intermittently via wireless communications 606. In an exemplary embodiment, the mobile robot 602 receives instructions from the central command center 604 which request the mobile robot 602 to locate a moveable power storage rack having specific storage characteristics (e.g., a certain amount of storage capacity), and based on the received instructions, the mobile robot 602 identifies the first moveable power storage rack 410g from among the plurality of moveable power storage racks 410d-410m.

The specific power storage characteristics can be, for example, power storage capacity of all the components in the rack (amount of power, amount of time a given amount of power can be outputted, etc.); storage capacity of each individual component in the rack (amount of power, amount of time a given amount of power can be outputted, etc.); peak power output of the rack; power subsystem 408 temperature (e.g. minimum temperature, maximum temperature, average minimum temperature, average maximum temperature, etc.); power subsystem 408 temperature exposure (e.g. number of times of X degrees for Y amount of time, etc.); battery temperature (e.g. minimum temperature, maximum temperature, average minimum temperature, average maximum temperature, etc.); battery temperature exposure (e.g. number of times of X degrees for Y amount of time, etc.); type of batteries; age of the batteries (e.g. average age of the batteries, etc.); most efficient dispatch range of the batteries, possible dispatch range of the batteries, current dispatch range of the batteries, etc.; state of charge (SoC) of the batteries (e.g., average SoC); throughput (e.g., average throughput); capacity (e.g. charge/discharge); time since last dispatch; cell voltage (e.g., minimum and/or maximum at the rack level, etc.); charge rate (C-rate); full cycle equivalents number; warranty information of the batteries; efficiency curve of the batteries; the maximum efficiency of the inverter; and life of the components, etc.

The specific power storage characteristic illustrated in FIGS. 6 and 7 is power storage capacity, and is exemplary. However, power storage racks can be connected and grouped according to any power storage characteristic or power storage characteristics. Power storage racks can also be connected and grouped based on characteristics other than power storage characteristics (e.g., model numbers of the racks, serial numbers of the racks, etc.).

In an exemplary embodiment illustrated in FIGS. 6 and 7, the mobile robot 602 is configured to move the first moveable power storage rack (rack 410g) from the first location A to the second location B by controlling the coupler 816, that is attached to the mobile robot 602, to connect to the first moveable power storage rack (rack 410g), and by rolling the first moveable power storage rack 410g by the plurality of rollers 814 to the second location B.

In an exemplary embodiment, the mobile robot 602 is configured to move to different locations by reading barcodes 610 that are located at various positions on a floor, as shown in FIGS. 6 and 7. The barcodes can be positioned as to form pathways/tracks 608 on the floor. The barcodes 610 allow the mobile robot 602 to determine its current location so that it can calculate how to navigate to its destination. The mobile robot 602 can move from location to location by any other manner, for example, by tracking landmarks, triangulating from landmarks or beacons, using visual sensors, storing maps/coordinates, GPS, etc.

In the exemplary embodiment of FIG. 6, when a power storage system having a four hour storage capacity is desired at location B, the mobile robot 602 will automatically locate a rack having a one hour storage capacity (rack 410g) to add to the existing three hour storage capacity already present at location B (the 2 hour storage capacity of rack 410i that is connected to the one hour storage capacity of rack 410j). After the mobile robot 602 has located the first moveable storage rack (rack 410g) based upon information received from the central command center 604 that indicates available racks having the desired characteristics, the mobile robot 602 attaches to the first moveable power storage rack (rack 410g) that is located at a first location A as shown in FIG. 6.

Next, as shown in FIG. 7, the mobile robot 602 can move the first moveable power storage rack (rack 410g) from the first location (location A) to the second location (location B) where the scalable system is to be created using two racks that are already present (racks 410i and 410j).

In an exemplary embodiment, the wireless communications that are received by the mobile robot 602 can include commands for controlling the mobile robot 602. For example, the commands may instruct the mobile robot 602 as to which location to go to next, what route to take to get to the next location, which electrical components the mobile robot 602 should locate, what task the mobile robot 602 should perform once an electrical component is located, tell the mobile robot 602 to recharge its batteries, tell the mobile robot 602 to power down, go into a power-saving mode, etc.

In an exemplary embodiment, as shown in FIG. 7, at least one second moveable power storage rack is located at the second location (Location B), and the mobile robot 602 is configured to connect the first moveable power storage rack to the at least one second moveable power storage rack. The mobile robot 602 creates a power storage system with a specific power storage capability that exceeds a predetermined amount of required power storage by connecting the first moveable power storage rack to the at least one second moveable power storage rack. For example, in FIGS. 6 and 7, other moveable storage racks (at least one second moveable power storage rack) 410i and 410j are located adjacent to the second location B, and the mobile robot 602 is configured to connect the first moveable power storage rack 410g to at least one of the second moveable power storage racks (racks 410i and 410j). Thus, as described above, by connecting storage rack 410g to storage racks 410i and 410j, a power system having a 4 hour storage capacity is created. In an exemplary embodiment, the mobile robot 602 creates a power storage system with a specific power storage capability (e.g., four hour capacity) that exceeds a predetermined amount of required power storage (e.g., three and a half hour capacity) by connecting the first moveable power storage rack 410g (having a one hour storage capacity) to the at least one second moveable power storage rack (racks 410i, 410j having a combined storage capacity of three hours).

These examples demonstrate how the mobile robot 602 is able to dynamically create scalable power systems automatically based on commands the robot 602 receives or other information the mobile robot 602 is able to obtain. This has many advantageous features. For example, expensive human workers are not needed to move the racks and connect the components to each other. The mobile robot 602 can work longer than human workers, work more efficiently, cause less errors, etc. Further, workers' compensation claims due to injured workers can be avoided and robots can be easily replaced in cases of mechanical or electrical failure.

In an exemplary embodiment, multiple receptacles could be positioned on a wall or other surface and can be connected to each other via a common line or lines (signal lines, power lines, etc.), and each power storage rack may contain a fixed connector that is located at the same height as the multiple receptacles and is complementary with and fits/connects with one of the receptacles. The mobile robot 602 can then connect a storage rack to a receptacle by moving the storage rack until the fixed connector inserts into the receptacle. If other storage racks are already connected to other receptacles sharing the same common line as the line the storage rack was just connected to, the storage racks will then be connected to each other and can send signals between each other, transmit power between each other, etc. In an exemplary embodiment, the mobile robot 602 is configured to connect a connector of the first moveable power storage rack 410g to a fixed receptacle that receives the connector, and the fixed receptacle is connected to the at least one second moveable power storage rack 410i, 410j. In this example, by the mobile robot 602 connecting the connector of the first moveable power storage rack 410g to the fixed receptacle, the first moveable power storage rack 410g and the at least one second moveable power storage rack 410i, 410j are easily connected to each other by only having to make one connection. However, it is possible that additional connections can be made to make two storage racks connect to each other.

In the exemplary embodiment shown in FIGS. 6 and 7, each or some of the plurality of moveable power storage racks 410d-410m can include, for example, a power subsystem 408 that is configured to be connected to a power line. The power subsystem 408 may include, for example, a power converter 416 which converts AC power to DC power when the at least one battery 406 is being charged, and converts DC power to AC power when the at least one battery 406 is being discharged. In the exemplary embodiment shown in FIGS. 6 and 7, each or some of the plurality of moveable power storage racks 410d-410m can include a control subsystem 100 that can be connected to the storage subsystem 434 and can be connected to the power subsystem 408. The control subsystem 100 can include a processor 102 that is configured to control transferring of power between the storage subsystem 434 and the power subsystem 408. The processor 102 can be configured to send signals which control the charging and discharging of at least one battery 406 of the one or more batteries 406. Also, the processor 102 can be configured to monitor an operational status of the one or more batteries 406.

In an exemplary embodiment, the mobile robot 602 is configured to check an operating status of a moveable power storage rack 410 by receiving information 222 that is displayed on a front panel of the control subsystem 100. In an exemplary embodiment shown in FIG. 8, the information that is displayed on the front panel is displayed by a plurality of light emitting diodes 222, and the mobile robot 602 gathers the information by reading the plurality of light emitting diodes 222 with a visual sensing device 808. Information can be displayed on the front panel by any means capable of displaying/conveying information. The front panel will be discussed in greater detail below with reference to FIG. 3. The visual sensing device 808 can be, for example, a scanning device, a receiver of light pulses, etc. In an exemplary embodiment, instead of receiving information about a power storage rack via the visual sensing device 808, the mobile robot 602 can receive data from the power storage rack wirelessly. For example, by near field communications (NFC), Bluetooth, Wi-Fi, etc.

In an exemplary embodiment, when the operation status of the moveable power storage rack 410g indicates an operation error, the mobile robot 602 is configured to automatically replace the moveable power storage rack 410g with another moveable power storage rack 410j. The moveable power storage rack that is replacing the power storage rack with the error can have similar or different characteristics. In this example, the malfunctioning power storage rack 410g with a one hour storage capacity is replaced with power storage rack 410j also having a one hour storage capacity.

Power Node System

Figure 4:
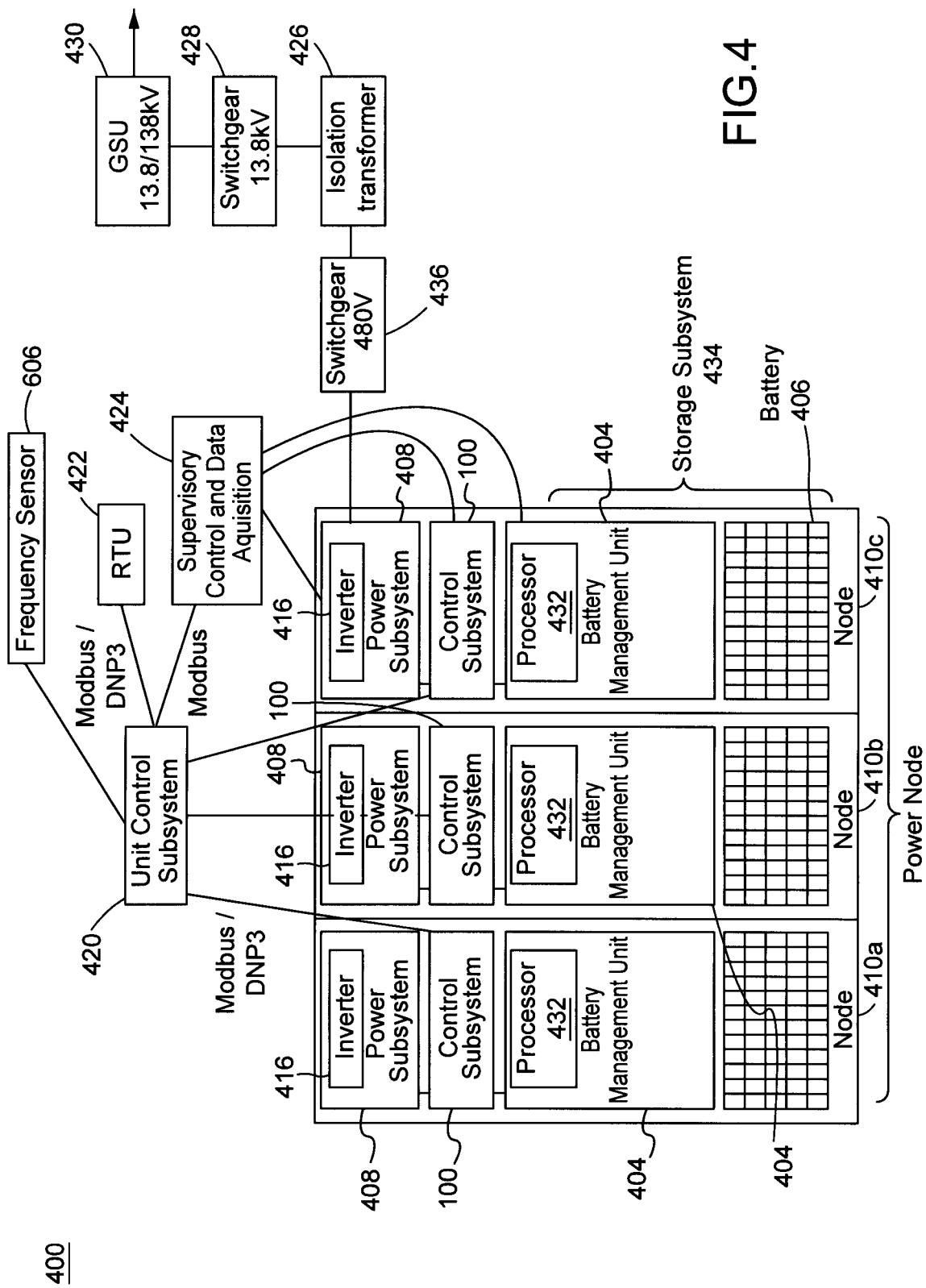
FIG. 4 illustrates a power system architecture in accordance with an exemplary embodiment.

FIG. 4 illustrates a power node system that is an exemplary scalable power system that can be created by the mobile robot 602. The power node system includes, for example, three nodes 410a, 410b, 410c. Each node 410a, 410b, 410c, is a node of power (i.e., stores power). The multiple nodes 410a, 410b, 410c form a unit or entity which will hereinafter be referred to as a power node. Any number of nodes could be used in the power node system of FIG. 4, as the system is scalable from one to hundreds or thousands of parallel nodes 410a, 410b, 410c, etc. Each node 410a can include: a storage rack or other container configured to securely hold the control subsystem 100, the power subsystem 408, and the storage subsystem 434 that includes one or more batteries 406 which are removable and chargeable. In an exemplary embodiment, each container 410 shown in FIGS. 6 and 7 can be a power node 410 as shown in FIG. 4.

Thus, due to the modularity of the components in the node, there is a physical and logical separation, and independence of the components. Due to the scalability of the power system, there can be separate scaling of power and duration characteristics. Also, the size of the power system can be easily adapted based on project requirements and business changes. The modularity eliminates a single point of failure, and minimizes on site construction as the components can have plug and play capability. In an exemplary embodiment, the mobile robot 602 can automatically scale and create the power system based on the power requirements that are needed, by moving or connecting various nodes 410 into the desired configuration based on need (e.g., power needs, cost needs, etc.).

In an exemplary embodiment shown in FIG. 4, each node 410, for example node 410a, includes the power subsystem 408, the control subsystem 100, and the storage subsystem 434. In an exemplary embodiment shown in FIG. 4, the storage subsystem 434 includes one or more batteries 406 which are removable and chargeable, and a processor 432 that is configured to monitor at least one battery of the one or more batteries 406.

The batteries 406 in the storage subsystem 434 can include batteries from different manufacturers or they can all be from the same manufacturer. Also, the batteries can all be of the same type (e.g. NiCd) or can be of different types. The storage subsystem 434 includes a battery management unit 404 including a computer processor 432 that is configured to monitor at least one battery of the one or more batteries 406 in the storage subsystem 434, and the battery management unit 404 is configured to communicate with the control subsystem 100. In an exemplary embodiment, the battery management unit 404 contains computer-based electronics and firmware responsible for safe charging/discharging of all batteries and communicates with the control subsystem 100.

The power storage and distribution system 400 shown in FIG. 4 also includes a unit control subsystem 420 that is connected to each of the three nodes 410a, 410b, and 410c. In other words, the control subsystem 100 of each node 410a, 410b, 410c is connected to the unit control subsystem 420. The unit control subsystem 420 serves an arbitrary number of nodes. For example, the unit control subsystem 420 is configured to monitor a current state of the plurality of nodes 410a, 410b, 410c in the power storage and distribution system 400 shown in FIG. 4. The unit control subsystem 420 monitors/maintains, for example, the current state and charge/discharge capacity for the group of nodes it is assigned to cover. Any number of nodes can be used in the power storage and distribution system 400 shown in FIG. 4. Communications between the control subsystems 100 of nodes and the unit control subsystem 420 can be, for example, via Modbus or DNP3. Modbus is a serial communications protocol that is used to connect industrial electronic devices. Modbus allows for communication between many devices connected to the same network.

In the power storage and distribution system 400 of FIG. 4, the unit control subsystem 420 is configured to monitor a charge/discharge capacity of the plurality of nodes 410a, 410b, 410c, etc. The unit control subsystem 420 is also configured to optimize health and performance of the storage subsystems 434, the power subsystems 408, and/or the control subsystems 100 in the plurality of nodes 410a, 410b, 410c, etc. using, for example, status/health/performance parameters described above. Also, the control subsystems 100 of each node can send a cost curve (e.g., Kilowatts vs. dollars) to the unit control subsystem 420, and the unit control subsystem 420 can determine which node is the cheapest resource to use, and use the power stored in the node that is the cheapest resource of power. In other words, the unit control subsystem 420 can bid between nodes in order to determine which node or nodes are the cheapest resource/resources of stored power. In an exemplary embodiment, the unit control subsystem 420 can rank the plurality of nodes based on their cost curve (e.g. cheapest to most expensive or most expensive to cheapest). In an exemplary embodiment, the mobile robot 602 can automatically create a power system by using nodes that are the cheapest resources of power, or create a power system based on other needs.

As described above, in each node 410a, 410b, 410c, the battery management unit 404 includes a processor 432 that is configured to monitor at least one battery 406, and is configured to communicate with the control subsystem 100. Also, in each node, the power subsystem 408 is configured to be connected to a power line, and the power subsystem 408 includes a power converter 416 (e.g. an inverter) which converts AC power to DC power when the at least one battery 406 is charged, and converts DC power to AC power when the at least one battery is discharged.

In each node 410a, 410b, 410c, the control subsystem 100 of the rack is connected to the storage subsystem 434 of the node and is connected to the power subsystem 408 of the node. The control subsystem 100 of the node includes the processor 102, and the processor 102 is configured to control transferring of power between the storage subsystem 434 and the power subsystem 408. In an exemplary embodiment, the processor 102 of the node is configured to send signals which control the charging and discharging of the at least one battery 406 in the node, and the processor 102 is configured to monitor an operational status of one or more batteries 406 in the node.

The power storage and distribution system 400 of FIG. 4 includes, for example, a frequency sensor 605, an RTU 422, and a supervisory control and data acquisition (SCADA) module 424 that is connected to the unit control subsystem 420. The frequency sensor 605 could be a voltage sensor, etc. The SCADA module 424 is a control system that performs data acquisition and is the primary user interface to the node control subsystems 410d, 410e, etc. As shown in FIG. 4, SCADA module 424 can send and/or receive data from the power subsystem 408, the control subsystem 100 and the storage subsystem 434 of node 410c. SCADA module 424 can also send and/or receive data from all of the subsystems 100, 408, 434 in nodes 410a and 410b. That is, the SCADA module 424 can talk to each subsystem separately. A market dispatch unit contains market intelligence (e.g. power costs, etc.) and can make intelligent decisions based on market information pertaining to the energy industry. Communications between the unit control subsystem 420 and the RTU 422 and the SCADA module 424 can be, for example, via Modbus or DNP3. The nodes 410a, 410b, 410c are connected to a switchgear 436 of, for example, 480V. Specifically, the switchgear 436 can be connected to the power subsystems 408 of the nodes 410a, 410b, 410c. In FIG. 4, the switchgear 436 is connected to an isolation transformer 426. The isolation transformer 426 is connected to a switchgear 428 of, for example, 13.8 kV. The switchgear 428 can also be connected to a generator step-up (GSU) transformer 430. The GSU transformer 430 can be for example, a 13.8/138 kV GSU transformer.

In FIG. 4, the power subsystem 408 can be configured to be connected to a power line. For example, FIG. 8 shows that the power subsystem 408 is connected to, for example, a 400V AC line-to-line electrical system. The line-to-line electrical system could have any other voltage amount. The power subsystem 408 includes a power converter (e.g. an inverter) 416 which converts AC power to DC power when at least one battery 406 is being charged, and converts DC power to AC power when at least one battery is being discharged.

Figure 5:
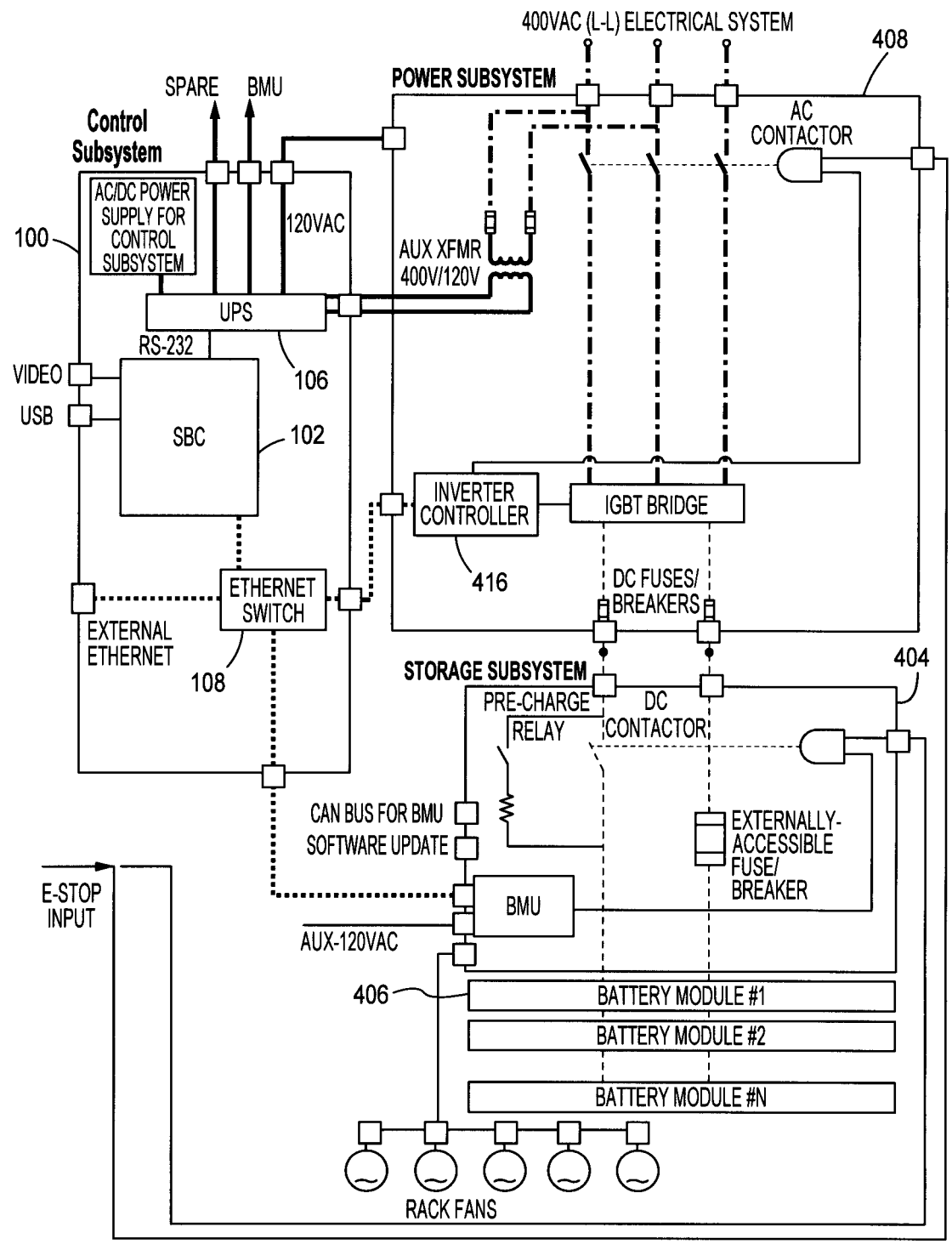
FIG. 5 illustrates interconnections of components in a node in accordance with an exemplary embodiment.

In FIGS. 4 and 5, the control subsystem 100 is connected to the storage subsystem 434 and is connected to the power subsystem 408. As shown in FIG. 7, the control subsystem 100 includes the processor 102, and the processor 102 is configured to control the transferring of power between the storage subsystem 434 and the power subsystem 408. FIG. 5 shows that the battery management unit 404 is electrically connected in between the power subsystem 408 and the battery modules 406.

In an exemplary embodiment, the processor 102 of the control subsystem 100 is configured to send signals which control the charging and discharging of at least one battery 406 located in the storage subsystem 434. Also, the processor 102 is configured to monitor an operational status of one or more batteries 406 located in the storage subsystem 434.

Figure 1:
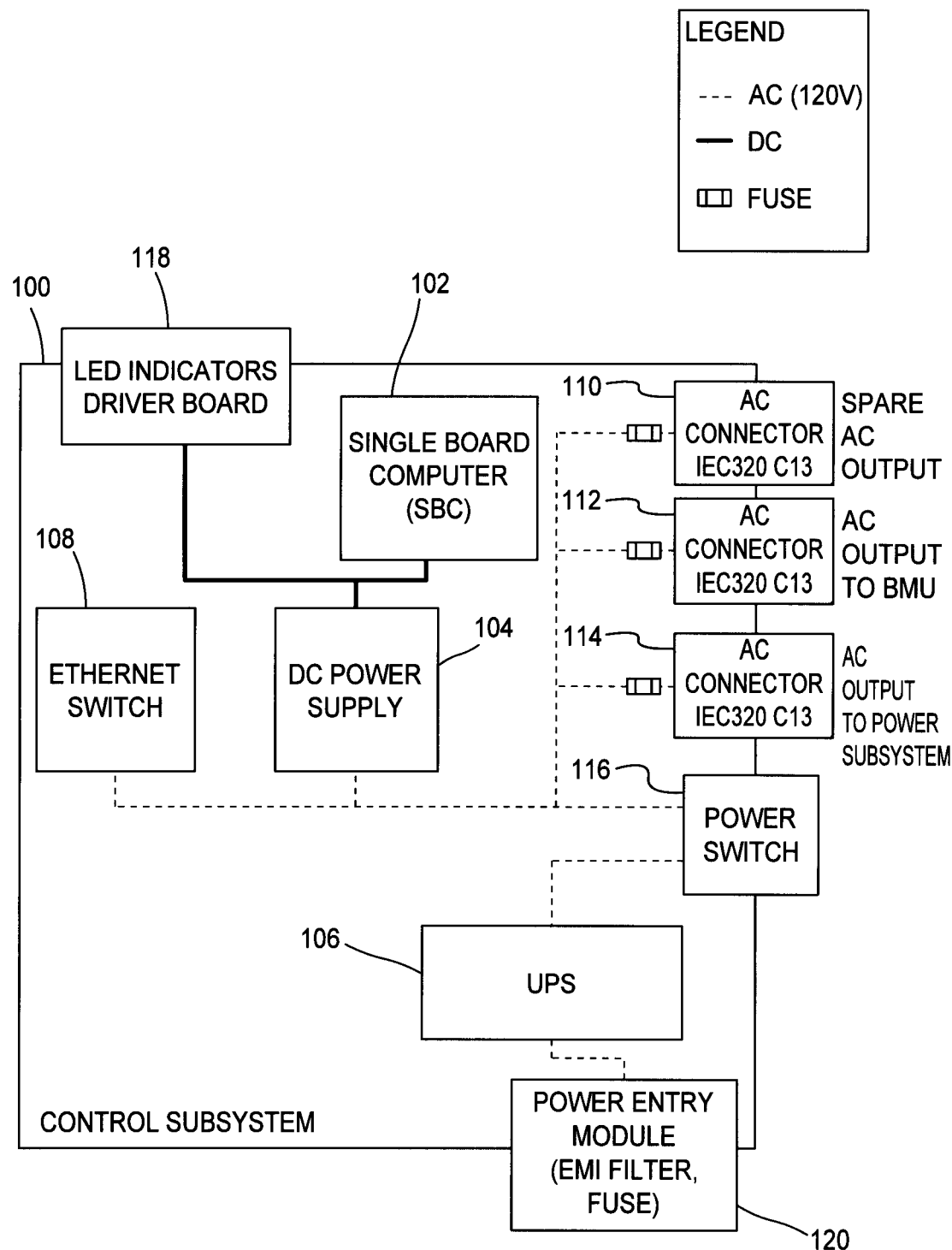
FIG. 1 illustrates a hardware architecture of the control subsystem in accordance with an exemplary embodiment.
Figure 2:
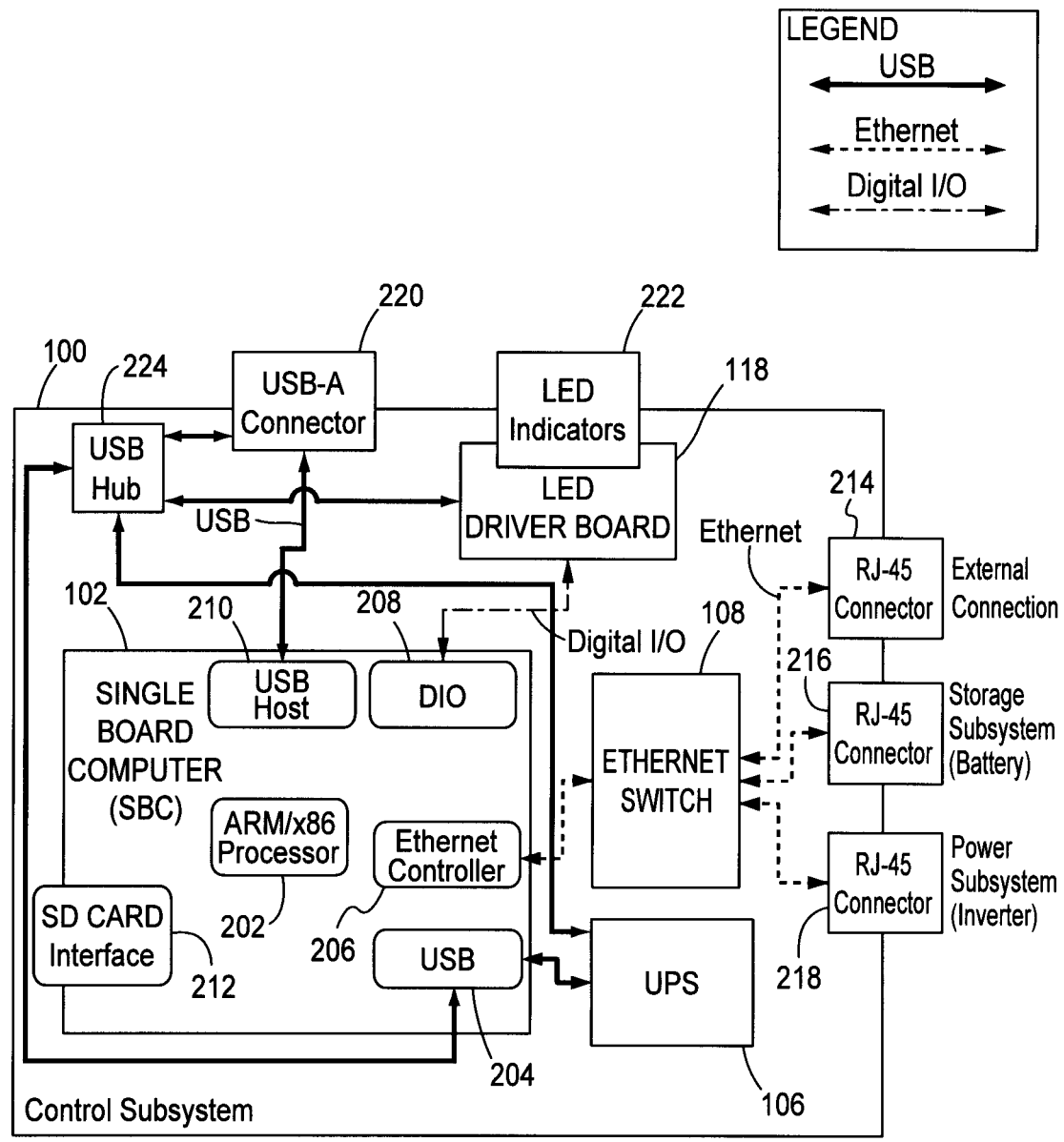
FIG. 2 illustrates a hardware architecture of the control subsystem in accordance with an exemplary embodiment.

As shown in FIGS. 1 and 2, an exemplary embodiment of a control subsystem 100 includes some or all of: an AC/DC power supply 104; an uninterruptable power supply 106; a processor 102; an Ethernet switch 108; a first communication interface 216 configured to send and/or receive data from the storage subsystem 434; a first transfer interface 112 configured to transmit power to the storage subsystem 434; a second communication interface 218 configured to send and/or receive data from the power subsystem 408; and a second transfer interface 112 configured to transmit power to the power subsystem 408.

In an exemplary embodiment, the processor 102 receives battery data from the storage subsystem 434, and based on information in the received battery data, the processor 102 instructs the power subsystem 408 to charge or discharge the at least one battery 406. The battery data can be, for example, power status, charging/discharging status, battery charge status (e.g., percent of charge), AC contactor status, DC contactor status, fault/error status, etc.

In an exemplary embodiment, the processor 102 of the control subsystem 100 is configured to optimize health and performance of the one or more batteries 406 monitored/managed by the storage subsystem 434 by using the status/health/performance parameters described later.

FIGS. 1 and 2 show exemplary hardware architectures of the control subsystem 100 and will be explained in greater detail below. Also, FIG. 5 shows exemplary hardware architectures of the power subsystem 408, the storage subsystem 404, and the control subsystem, and how these subsystems are interconnected, and will be explained in greater detail below.

Each control subsystem 100 of each node can store a preference profile which includes some or all of the following parameters pertaining to the node the preference profile is stored in:

optimal charge/discharge rates of the batteries in the node;

most efficient dispatch range of the batteries in the node, possible dispatch range of the batteries, current dispatch range of the batteries, etc.;

efficiency curve of the batteries in the node;

current state/status of the node (e.g., whether it is online/offline, the current mode, errors that have occurred and/or are present, etc.);

power subsystem preferred operating temperature (e.g. minimum temperature, maximum temperature, etc.);

preferred battery temperature (e.g. minimum temperature, maximum temperature, etc.);

the maximum efficiency of an inverter in the power subsystem;

history of the batteries in the node (e.g., what have the batteries been doing over a recent time period, etc.);

throughput (e.g., average throughput);

warranty information of the batteries; and life of the components, etc.

In an exemplary embodiment, the components of the node (the control subsystem 100, the power subsystem 408, and the storage subsystem 434) are configured to be mounted to a rack as explained above. However, the components of a node could be located within a container, vessel, etc. and do not need to be mounted to a rack. Also, a node could be comprised of one rack of components or multiple racks of components.

FIG. 4 shows that a node includes one storage subsystem 434, one control subsystem 100, and one power subsystem 408; however, a node could contain any number of subsystems. For example, a node could contain multiple storage subsystems, multiple power subsystems 408, and multiple control subsystems 100. Also, in an exemplary embodiment, the node could include another subsystem other than the control subsystem 100, the storage subsystem 434, and the power subsystem 408, e.g., a reactive power subsystem or a power generation subsystem. In another exemplary embodiment, the node would not include a power subsystem 408 that includes batteries, as a node does not have to include a power subsystem.

Control Subsystem Hardware Architecture

FIGS. 1 and 2 are exemplary embodiments of a hardware architecture of the control subsystem 100. The control subsystem 100 is a control unit that interfaces with the power subsystem 408 and the storage subsystem 434 that includes a battery management unit 404 and at least one battery 406. The control subsystem 100, the power subsystem 408, and the storage subsystem 434 comprise a power unit called a node 410, as described above. The control subsystem 100 can send signals to the power subsystem 408 and the battery management unit 404 which bring about the charging or discharging of a battery or batteries 406 by components in the power subsystem 408. The battery management unit 404 can connect and disconnect the batteries 406 in the storage subsystem 434. The control subsystem 100 can monitor/manage the current state, health (e.g. long-term and short-term), and/or performance (e.g. long-term and short-term) of the batteries and/or other components in the power storage system. The current state and health parameters will be discussed in greater detail later.

FIG. 1 shows the control subsystem 100, and the electrical connections of various components located within the control subsystem 100. As shown in the legend of FIG. 1, a broken line denotes an alternating current (AC) line of, for example 120V. It is possible that the AC voltage could be any other voltage than 120V. Also, in FIG. 1, a solid line denotes a direct current (DC) line. It is possible for AC lines to instead be DC lines, and for the DC lines to instead be AC lines. It is also possible for all of the lines in FIG. 6 to be all AC lines or all DC lines, or any combination of AC lines and DC lines.

The control subsystem 100 is configured to control transferring of power. The control subsystem 100 includes: an AC/DC power supply 104 (e.g., a DC power supply as in FIG. 1); an uninterruptable power supply (UPS) 106; a processor 102; an Ethernet switch 108; a power switch 116; and a power entry module 120 (EMI filter, fuse, etc.). The processor 102 could be any type of computer processor, including a single board computer, etc. For example, the processor 102 can be a single processor, a plurality of processors, or combinations thereof. The processor 102 may have one or more processor "cores." The single board computer can be, for example, a Raspberry Pi single board computer. The single board computer can include, for example, a 32-bit processor with an ARM or x86 core architecture 202. In an exemplary embodiment, the single board computer can use a MathWorks, Inc. embedded code supported processor. In an exemplary embodiment, the single board computer can include a memory having a capacity of 512 MB or more. Alternatively, the storage capacity of the memory of the single board computer can be any size. The memory could be a RAM, ROM, etc. In an exemplary embodiment, the software of the control subsystem 100 can be stored outside of the control subsystem 100.

The Ethernet switch 108 can be, for example, a 10/100 Mbps or faster Ethernet controller. The Ethernet switch 108 can have any number of ports, for example, at least five ports. A first port for the single board computer 102, a second port for the uninterruptable power supply 106, a third port for the battery management unit 404 located in the storage subsystem 434, a fourth port for the power subsystem 408, and a fifth port for an upstream network connection.

The control subsystem 100 also includes a first communication interface 216 configured to send and/or receive data from a storage subsystem 434 that monitors one or more batteries 406 that are removable and chargeable.

The batteries can be any type of battery, including rechargeable batteries (e.g., flow battery, fuel cell, lead-acid, lithium air, lithium-ion, molten salt, nickel-cadmium (NiCd), nickel hydrogen, nickel-iron, nickel metal hydride, nickel-zinc, organic radical, polymer-based, polysulfide bromide, potassium-ion, rechargeable alkaline, silicon air, sodium-ion, sodium-sulfur, super iron, zinc-bromine, zinc matrix, etc.) and/or non-rechargeable batteries (e.g., alkaline, aluminum-air, atomic, Bunsen cell, chromic acid cell, Clark cell, Daniell cell, dry cell, earth, frog, galvanic cell, grove cell, Leclanche cell, lemon, lithium, lithium air, mercury, molten salt, nickel oxyhydroxide, organic radical, paper, potato, Pulvermacher's chain, reserve, silver-oxide, solid-state, voltaic, water-activated, Weston cell, zinc-air, zinc-carbon, zinc chloride, etc.). The storage subsystem 434 can include only one type of battery or a combination of different types of batteries.

The first communication interface 216 can be, for example, a RJ-45 connector as shown in FIG. 2. The first communication interface can also be any other type of data connector and may consist of one or more connectors.

The control subsystem 100 also includes a first transfer interface 112 configured to transmit power to the battery management unit 404. The first transfer interface 112 can be, for example, an AC connector IEC320 C13 as shown in FIG. 1. The first transfer interface 112 can also be any other type of data connector and may include one or more connectors.

The control subsystem 100 also includes a second communication interface 218 configured to send and/or receive data from a power subsystem 408. The second communication interface 218 can be, for example, a RJ-45 connector as shown in FIG. 2. The second communication interface 218 can also be any other type of data connector and may include one or more connectors. The control subsystem 100 also includes a spare AC output connector 110 which can be, for example, an AC connector IEC320 C13. The power subsystem 408, shown in FIG. 5, includes a power converter 416, and the power subsystem 408 is configured to be connected to a power line. The power converter 416 can be an AC or DC inverter, the inverter has the ability to connect or disconnect itself. An exemplary embodiment of the power subsystem 408 is shown in FIG. 5.

The control subsystem 100 of FIG. 1 also includes a second transfer interface 114 that is configured to transmit power to the power subsystem 408. The second transfer interface 114 can be, for example, an AC connector IEC320 C13 as shown in FIG. 1. The second transfer interface 114 can also be any other type of data connector and may include one or more connectors. In an exemplary embodiment, one or more of the first transfer interface 112, the second transfer interface 114, and the spare AC output connector 110 may not be powered by the uninterruptable power supply 106.

The processor 102 is configured to send signals which control the charging and discharging of at least one battery 406 in the storage subsystem 434. The control subsystem 100 is used to coordinate power transfer between the storage subsystem 434 and the power subsystem 408. The power subsystem 408 is responsible for pulling power from the grid and transferring it to the battery or batteries 406. The power system 408 can also pull power from the battery or batteries and transfer it to the grid.

The uninterruptable power supply 106, shown in FIG. 1, provides temporary 120V AC power in the event of disconnection of the control subsystem 100 from facility power lines. The uninterruptable power supply 106 can supply, for example, 250 W at 120V AC, under both a normal state (i.e., external 120V AC available) and a power loss state (i.e., no external 120V AC available, running from batteries). The uninterruptable power supply 106 can supply temporary power at any other voltage or power level. As shown in FIG. 5, the uninterruptable power supply 106 can provide power to the power subsystem 408 module and to a battery management unit (BMU) 404 (i.e. a computer processor) of the power subsystem 434. The battery management unit 404 tells the power subsystem 408 when it can charge or discharge the battery or batteries 406. The uninterruptable power supply 106 can, for example, have sufficient capacity to provide at least five minutes of 120V AC, 250 W output operation under power loss conditions. The uninterruptable power supply 106 can also include protective devices (fuses, breakers, etc.) for each 120V AC output terminal of the uninterruptable power supply 106.

The AC/DC power supply 104 provides power to the components of the control subsystem 100 and is sized to provide continuous operation of the components. The control subsystem 100 is used to coordinate interactions between the storage subsystem 434 and the power subsystem 408, and to control overall operational functions of a node 410a, 410b, 410c, etc. including charging, discharging, DC idle, safe shutdown, and emergency modes.

In an exemplary embodiment, the processor 102 is configured to optimize health and performance of the one or more batteries 406 in the storage subsystem 434. The health and performance of the one or more batteries 406 can be long-term health and performance or short-term health and performance. Parameters that indicate the current status, the performance, or the short-term/long-term health of the batteries, may include all or some of the following:

current state/status of the node 410 (e.g., whether it is online/offline, the current mode, errors that have occurred and/or are present, etc.); power subsystem 408 temperature (e.g. minimum temperature, maximum temperature, average minimum temperature, average maximum temperature, etc.);

power subsystem 408 temperature exposure (e.g. number of times of X degrees for Y amount of time, etc.);

battery temperature (e.g. minimum temperature, maximum temperature, average minimum temperature, average maximum temperature, etc.);

battery temperature exposure (e.g. number of times of X degrees for Y amount of time, etc.);

age of the batteries (e.g. average age of the batteries, etc.);

most efficient dispatch range of the batteries, possible dispatch range of the batteries, current dispatch range of the batteries, etc.;

state of charge (SoC) of the batteries (e.g., average SoC);

throughput (e.g., average throughput);

capacity (e.g. charge/discharge);

time since last dispatch;

cell voltage (e.g., minimum and/or maximum at the rack level, etc.);

charge rate (C-rate);

full cycle equivalents number;

warranty information of the batteries;

efficiency curve of the batteries;

the maximum efficiency of the inverter; and life of the components, etc.

Some or all of the above status/health parameters can be used to optimize performance and/or health of the batteries. In an exemplary embodiment, the processor 102 is configured to monitor an operational status of the one or more batteries 406. The operational status could indicate a fault, charging of the storage subsystem 434, discharging of the storage subsystem 434, percentage of power available, etc.

FIG. 2 shows the control subsystem 100, and the data connections of various components located within the control subsystem 100. In FIG. 2, the USB connector 220 is connected to USB host 210 in the single board computer 102 via a USB connection. The single board computer 102 also includes a digital I/O module 208 that is connected to an LED driver board 118 via a digital I/O connection. The LED driver board 118 controls LED indicators 222 which output status information regarding the control subsystem 100 and/or the node 410a. In an exemplary embodiment, the total power required during normal operation and during power up by the control subsystem 100 is less than 80 W. In another exemplary embodiment, the control subsystem 100 is able to perform a power cycle of the uninterruptable power supply 106 output.

FIG. 2 also shows a USB module 204 that is connected to the uninterruptable power supply 106 via a USB connection. The single board computer 102 also includes an Ethernet controller 206 that is connected (for example via an Ethernet connection) to an Ethernet switch 108 that is located outside of the single board computer or processor 102. The Ethernet switch 108 is connected to each of the connectors 214, 216, and 218 via separate Ethernet lines.

In an exemplary embodiment, the control subsystem 100 includes a port that allows the processor 102 to be programmed or reprogrammed. For example, the port could be a USB port 220 (USB 2.0, USB 3.0, etc.) as shown in FIG. 2. The port can be any other data port that receives and/or transmits data, e.g., RS-232, Ethernet port, etc. Instead of a physical port 220 or in addition to the physical port 220, the processor 102 could be programmed or reprogrammed remotely via Wi-Fi, NFC, etc.

In an exemplary embodiment, the control subsystem 100 includes an SD card interface 212 configured to accept an SD card. The interface 212 could instead accept an SDHC or a micro SD card, etc. The SD card preferably stores 4 GB or more of data. The single board computer 102 could include any other type of memory device (RAM, ROM, hard drive, optical drive, etc.) other than the SD card interface 212 and the SD card.

The exemplary control subsystem 100 of FIG. 2 can also include a USB hub 224 that is connected to the USB-A connector 220, the UPS 106, the LED driver board 118, and the USB module 204 via USB connections. The digital I/O and USB connections shown in FIG. 2 are interchangeable.

Interconnections of Subsystems in a Node

FIG. 5 illustrates how the various components that make up a node (control subsystem 100, the power subsystem 408, and the storage subsystem 434) can be connected to each other. As described above, the mobile robot 602 can automatically connect the control subsystem 100, the power subsystem 408, and the storage subsystem 434 to each other. In FIG. 5, the protocols shown in the legend are exemplary. In FIG. 5, the control subsystem 100 is connected to the power subsystem 408 via three connections, for example. Two of the connections are 120V AC connections and one of the connections is an Ethernet connection that connects the Ethernet switch 108 of the control subsystem 100 to the inverter controller 416 of the power subsystem 408. One of the 120V AC connections is a connection between the uninterruptable power supply 106 and a 400V/120V transformer contained in the power subsystem 408. In addition to the transformer, the power subsystem 408 includes an AC contactor, and IGBT bridge and an inverter controller 416. In an exemplary embodiment, power to the uninterruptable power supply 106 does not have to come from the power subsystem 408.

The power subsystem 408 is connected to the storage subsystem 434 via two DC connections. The storage subsystem 434 also includes a DC contactor, a pre-charge relay, a battery management unit 404 (e.g. a computer processor), and an externally-accessible fuse/breaker. The power subsystem 408 is connected to the batteries 406 via DC connections. The power subsystem 408 can also be connected to one or more rack fans that are used to cool down the components if they are stored in a rack.

FIG. 5 also shows that the control subsystem 100 is connected to the storage subsystem 434 via an Ethernet connection. Specifically, the Ethernet switch 108 is connected to the battery management unit 404 of the storage subsystem 434. FIG. 5 also shows an emergency stop input line to which an emergency stop push-button switch can be connected. The emergency stop push-button switch can be mounted to an accessible location, and when it is pressed, causes power sources to be disconnected. For example, the power subsystem 408 can be disconnected from the storage subsystem 434 and from the energy storage facility AC bus.

Front Panel of the Node Control Subsystem

FIG. 3 shows an exemplary embodiment of a front panel of a control subsystem 100 used, for example, to control a node. The front panel includes a power on/off switch 302. The power on/off switch 302 can be a mechanical switch or a membrane switch. The power on/off switch 302 allows all 120V AC output power from the uninterruptable power supply 106 to be interrupted. Thus, the power on/off switch 302 can allow all 120V AC power to be cut for resetting the control subsystem 100, the power subsystem 408, and the storage subsystem 434 for servicing/installation.

FIG. 3 shows a plurality of LEDs 222 that are visual status indicators that indicate, for example, power status, charging/discharging status, battery charge status, AC contactor status, DC contactor status, fault/error status, etc. As described above, the mobile robot 602 can read the visual status indicators and perform appropriate actions based on the status of the control subsystem 100 or other subsystems (e.g., swap out components, remove components, add components, replace the entire node, etc. The power status indicator can indicate the presence of AC power at the uninterruptable power supply 106 output. The charging/discharging status indicator can be a bicolor LED in which one color indicates charging and the other color indicates discharging. Also, the AC contactor status indicator can be a bicolor LED in which one color indicates that the AC contactor is open and the other color indicates that the AC contactor is closed. Similarly, the DC contactor status indicator can be a bicolor LED in which one color indicates that the DC contactor is open and the other color indicates that the DC contactor is closed.

FIG. 3 also shows a LCD screen 304 that displays additional status information. For example, in FIG. 3, the LCD screen 304 indicates that the control subsystem 100 is operating as a power node controller, i.e. that it is monitoring the components of a node, e.g., the components contained in one storage rack. The LCD screen 304 also displays that the batteries are charging and what the current percentage of available battery power is. Lastly, the LCD screen 304 indicates that power is on. FIG. 3 also contains a plurality of keys 306 that can be pressed in order to navigate through menus or information displayed on the LCD screen 304. FIG. 3 also shows a port 308 (e.g. USB-A port) that is located on the front panel of the control subsystem 100. This port 308 can be the same as port 220 shown in FIG. 2 or a different port. FIG. 3 also shows an HDMI port 310 that is located on the front panel of the control subsystem 100. In an exemplary embodiment, the HDMI port 310 can be used to output video data, which includes various operating parameters, to a display device such as a LCD screen, etc. In another exemplary embodiment, the HDMI port 310 can be used to program or reprogram the processor 102.

While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A power storage rack distribution system, comprising:
a plurality of moveable power storage racks, each moveable power storage rack includes:
a storage subsystem including one or more batteries which are removable and chargeable, and a processor that is configured to control charging and discharging of at least one battery among the one or more batteries; and
a mobile robot that includes a second processor, a motor, and a battery, wherein the mobile robot is configured to:
locate a first movable power storage rack having specific power storage characteristics from among the plurality of moveable power storage racks,
attach to the first moveable power storage rack that is located at a first location, and
move the first moveable power storage rack from the first location to a second location.

2. The power storage rack distribution system of claim 1, wherein at least one second moveable power storage rack is located adjacent to the second location, and the mobile robot is configured to connect the first moveable power storage rack to the at least one second moveable power storage rack.

3. The power storage rack distribution system of claim 1, wherein the mobile robot is configured to connect a connector of the first moveable power storage rack to a fixed receptacle that receives the connector, and the fixed receptacle is connected to the at least one second moveable power storage rack.

4. The power storage rack distribution system of claim 2, wherein the mobile robot creates a power storage system with a specific power storage capability that exceeds a predetermined amount of required power storage by connecting the first moveable power storage rack to the at least one second moveable power storage rack.

5. The power storage rack distribution system of claim 1, wherein each of the plurality of moveable power storage racks further includes:
a power subsystem configured to be connected to a power line, and the power subsystem includes a power converter which converts AC power to DC power when the at least one battery is being charged, and converts DC power to AC power when the at least one battery is being discharged; and
a control subsystem connected to the storage subsystem and connected to the power subsystem, the control subsystem includes a third processor, and the third processor is configured to control transferring of power between the storage subsystem and the power subsystem,
wherein the third processor is configured to send signals which control the charging and discharging of at least one battery of the one or more batteries, and
wherein the third processor is configured to monitor an operational status of the one or more batteries.

6. The power storage rack distribution system of claim 5, wherein the mobile robot is further configured to check an operating status of a moveable power storage rack by receiving information that is displayed on a front panel of the control subsystem.

7. The power storage rack distribution system of claim 6, wherein the information that is displayed on the front panel is displayed by a plurality of light emitting diodes, and the mobile robot gathers the information by reading the plurality of light emitting diodes with a visual sensing device.

8. The power storage rack distribution system of claim 6, wherein when the operation status of the moveable power storage rack indicates an operation error, the mobile robot is configured to automatically replace the moveable power storage rack with another moveable power storage rack.

9. The power storage rack distribution system of claim 1, wherein the mobile robot is configured to move to different locations by reading barcodes that are located at various positions on a floor.

10. The power storage rack distribution system of claim 1, wherein the mobile robot is configured to receive instructions from a central command center via wireless communications.

* * * * *